(12) United States Patent
Mack et al.

(10) Patent No.: US 7,100,981 B2
(45) Date of Patent: Sep. 5, 2006

(54) CHILD SEAT AND METHOD FOR RECOGNITION OF A CHILD SEAT

(75) Inventors: Frank Mack, Stuttgart (DE); Thomas Lich, Schwaikheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/522,695

(22) PCT Filed: Jun. 2, 2003

(86) PCT No.: PCT/DE03/01806

§ 371 (c)(1),
(2), (4) Date: Jan. 27, 2005

(87) PCT Pub. No.: WO2004/039623

PCT Pub. Date: May 13, 2004

(65) Prior Publication Data

US 2005/0264061 A1     Dec. 1, 2005

(30) Foreign Application Priority Data

Oct. 24, 2002   (DE) ................................ 102 49 465

(51) Int. Cl.
*A47C 1/08* (2006.01)
*A47D 1/10* (2006.01)

(52) U.S. Cl. .................. 297/250.1; 297/256.16

(58) Field of Classification Search ............. 297/250.1, 297/253, 254, 255, 256, 256.1, 256.11, 256.12, 297/256.13, 256.14, 256.15, 256.16
See application file for complete search history.

(56) References Cited

U.S. PATENT DOCUMENTS

| 3,992,028 | A | * | 11/1976 | Abe et al. ................ 297/254 X |
| 4,834,420 | A | * | 5/1989 | Sankrithi et al. ..... 297/250.1 X |
| 4,936,629 | A | * | 6/1990 | Young .................... 297/256.12 |
| 4,971,392 | A | * | 11/1990 | Young .................... 297/256.12 |
| 4,979,777 | A | * | 12/1990 | Takada ..................... 297/250.1 |
| 5,375,908 | A | * | 12/1994 | Goor .................. 297/256.15 X |
| 5,468,014 | A | * | 11/1995 | Gimbel et al. ...... 297/256.12 X |
| 5,581,234 | A | * | 12/1996 | Emery et al. ........ 297/250.1 X |
| 5,618,056 | A | * | 4/1997 | Schoos et al. ........ 297/250.1 X |
| 5,653,501 | A | * | 8/1997 | Goor .................... 297/250.1 X |
| 5,655,817 | A | * | 8/1997 | Nienow ................ 297/250.1 X |
| 5,678,854 | A | * | 10/1997 | Meister et al. ....... 297/250.1 X |
| 5,711,574 | A | * | 1/1998 | Barnes ................. 297/250.1 X |
| 5,720,519 | A | * | 2/1998 | Barnes ............... 297/256.15 X |
| 5,779,304 | A | * | 7/1998 | Cunningham ........ 297/250.1 X |
| 5,851,026 | A | * | 12/1998 | Schoos et al. ....... 297/250.1 X |
| 5,882,035 | A | * | 3/1999 | Munro ................ 297/250.1 X |
| 6,206,470 | B1 | * | 3/2001 | Baloga et al. ........... 297/250.1 |
| 6,715,830 | B1 | * | 4/2004 | Alexy ..................... 297/250.1 |
| 6,736,455 | B1 | * | 5/2004 | Zakovic et al. ......... 297/256.15 |
| 6,831,565 | B1 | * | 12/2004 | Wanami et al. ...... 297/250.1 X |
| 6,863,286 | B1 | * | 3/2005 | Eros et al. ........... 297/250.1 X |

(Continued)

FOREIGN PATENT DOCUMENTS

DE      10 82 311      5/1960

(Continued)

*Primary Examiner*—Rodney B. White
(74) *Attorney, Agent, or Firm*—Kenyon & Kenyon LLP

(57) ABSTRACT

In a child seat and a method for child-seat detection, a radio-identification chip, which is configured solely as a transmitter module, is introduced in the child seat, preferably in the fabric. Due to the automatically emitted radio signal, the child seat is detected by corresponding receiver devices in the vehicle.

5 Claims, 2 Drawing Sheets

U.S. PATENT DOCUMENTS

| | | |
|---|---|---|
| 6,935,687 B1 * | 8/2005 | Gray et al. ................ 297/253 |
| 2002/0030394 A1 * | 3/2002 | Ito ............................. 297/256 |
| 2003/0189365 A1 * | 10/2003 | Alexy ..................... 297/250.1 |
| 2004/0075317 A1 * | 4/2004 | Yoshida et al. .......... 297/250.1 |
| 2004/0232747 A1 * | 11/2004 | Yamazaki et al. ....... 297/250.1 |
| 2004/0251721 A1 * | 12/2004 | Yoshida ................... 297/250.1 |
| 2005/0121956 A1 * | 6/2005 | Dolan et al. ................ 297/253 |
| 2005/0151401 A1 * | 7/2005 | Evans ..................... 297/250.1 |
| 2005/0189805 A1 * | 9/2005 | Burley et al. ............ 297/250.1 |
| 2005/0225139 A1 * | 10/2005 | Biaud .................... 297/256.12 |

FOREIGN PATENT DOCUMENTS

| | | |
|---|---|---|
| DE | 198 00 638 | 7/1998 |
| DE | 198 21 501 | 11/1998 |
| EP | 0 721 863 | 7/1996 |
| WO | 01 09964 | 2/2001 |
| WO | 02 14100 | 2/2002 |

* cited by examiner

CHILD SEAT AND METHOD FOR RECOGNITION OF A CHILD SEAT

BACKGROUND INFORMATION

A transponder system for child-seat detection is known from German Patent Application No. DE 198 21 501. This system utilizes radio signals to detect a child seat, the child-seat detection in the vehicle seat transmitting a radio signal to the transponder in the child seat, which then retransmits this signal in changed form. The child-seat identification is carried out on the basis of the retransmitted radio signal.

SUMMARY OF THE INVENTION

The child seat and the method for child-seat detection according to the present invention have the advantage over the related art that they provide a simplified system for child-seat detection. It is distinguished in that a radio-identification module, which includes an identifier, is preferably introduced in the fabrics of the child seat. The radio-identification chip transmits a radio signal, which includes the identifier on the basis of which the child seat is detected, this transmission taking place continuously or intermittently, without any request. For that reason, the radio-identification chip is configured as transmitter module only and has no receiver structures. On the other hand, a receiver structure, but not necessarily a transmitter structure, is present in the vehicle seat. The radio identification according to the present invention is therefore achieved solely by a radio transmission from the child seat to the vehicle seat. Another advantage is that the simple, uncomplicated methodology applies to all child-seat manufacturers, so that a child seat specified by the vehicle manufacturer must not necessarily be purchased. Another advantage is that no intervention in the design of the child seat is required which, if necessary, also allows retroactive fitting using appropriate fabrics.

The vehicle may additionally include a conventional child-seat detection as it is known from the related art.

It is particularly advantageous that the radio-identification chip is woven into the fabric itself. The radio-identification chip module may be bonded to the conductive web strips as it happens in wire-bonding methods. As an alternative, a flexible plastic foil, similar to a flexible circuit board, having attached connection pads may be used. In both cases the radio-identification chip and the connecting region are hermetically encapsulated. The energy for the radio-identification chip in the fabrics may be provided either by an energy store such as a battery or an accumulator, which is rechargeable, or by a thermogenerator. Since the human body generates energy in the form of heat on the order of several 10 watts, it makes sense to utilize a portion of this energy. Miniaturized thermogenerators, for instance, are able to obtain electrical energy from the temperature difference between the body surface and the ambient environment. Thermogenerators are simple electrical components made up of two different conductors or semiconductors. They are joined to one another at one end in each case and in this way form a thermo pair. If there is a temperature difference between the two sides of a thermo pair, an electrical voltage will be generated due to the so-called Seebeck effect, and current will be able to flow through a connected load, which in this case is the radio-identification chip module. A thermogenerator is made up of a multitude of thermo pairs, all of which are electrically interconnected in series and arranged side-by-side, in meander-shape, in order to ensure optimum space utilization. In this way, high overall voltages and electrical outputs are achieved. In contrast to batteries, these thermogenerators have very advantageous characteristics: They are washable, robust, they are made of environmentally friendly materials and have a practically unlimited service life. When thermogenerators are implemented in textiles, it is important to select locations where the occurring temperature differences between the inside and outside are as high as possible. For a reliable, constant energy supply the generated temperature profiles at moderate ambient temperatures and with thin clothing must be taken into account. Relatively low temperature differences of four to six Kelvin are measured at the wrists, which generally have low skin temperature. In contrast, the neck region reaches very high values. A collar in close contact with the skin generates temperature differences of 17 Kelvin, which makes this region very attractive for obtaining energy. However, this is in some respects not so attractive for a child seat. Nevertheless, the results generally indicate that temperature differences of at least 5 Kelvin are attained in the clothing, even at moderate ambient temperatures.

To achieve the highest possible temperature difference across the thermogenerator, it must be integrated directly into the fabric and an excellent thermal transition to the skin has to be ensured. For its coupling to the outside, thin copper platelets in each case are affixed to its cold and hot side. Copper is particularly suitable due to the fact that it has very high thermal conductivity. To prevent the copper from discoloring the skin, it is also galvanically coated by a thin layer of gold or silver. The thermogenerator chip is encapsulated in a waterproof manner using polyurethane. The electrical contacts are connected to the silver-coated copper wires, which are insulated with the aid of polyester varnish and woven into the fabric. A buffer capacitor, which stores the generated energy, may be integrated directly at the thermogenerator or some other spot in the clothing. In the case of a temperature difference of 5 Kelvin across the thermogenerator chip made of silicon, an electrical power output of 1.0 ☐watt per square centimeter is generated under a load and a no-load voltage of 10 volt per square centimeter. These values already suffice to supply a wristwatch with energy. Higher outputs may be obtained by higher temperature differences and a larger active surface. A power output of 10 to 300 ☐watt is sufficient to supply medical sensors with energy and to transmit the data to a recording device in a wireless manner.

The child-seat detection according to the present invention may advantageously be combined with other methods for child-seat detection with the goal of achieving plausibility or increased reliability of the child-seat detection. For instance, it may be connected to a child-seat detection that determines the child seat via the seat-pressure profile, for example with the aid of a sensor mat, or which has an optical identification system for child-seat detection, i.e., a video sensor.

DETAILED DESCRIPTION

Apart from a direct mass determination in order to identify a child seat on the passenger side, there is the possibility of equipping the child seat with a transponder system. The so-called OC (occupant classification) mat includes a transmitter and receiver antenna. The child seat has at least one or a plurality of transponder coils, which react to the signal transmitted by the OC mat and return a corresponding signal, partially in encoded form. Via the receiver antenna it is then analyzed whether a child seat is located on the seat. Furthermore, it is ascertained on the basis of an identification what type of child seat is involved and how it is positioned.

According to the present invention, another method for the contact-less or contact-free detection or identification of child seats will now be introduced. In this context a method and a child seat are to be provided, which may be realized without major changes in the child seat itself. This allows every child-seat manufacturer to utilize the methodology of the transponder detection yet does not result in competitive distortions.

According to the present invention, a radio-identification chip, which will then emit an identifier for this particular child seat, is introduced into the fabrics of the child seat. The radio-identification chip has no receiver device and is supplied by its own energy supply, namely either a thermogenerator or an energy store such as a battery. It may be provided that the energy store be rechargeable or exchangeable. More than one radio-identification chip may be used in a child seat. The radio-identification chip is preferably woven into the textiles and is able to emit the radio signal on a permanent or intermittent basis. The method according to the present invention may be used in addition to other methods for child-seat detection such as analyzing a seat-pressure profile or an optical identification. This allows a plausibilization of these results.

Figure 1:
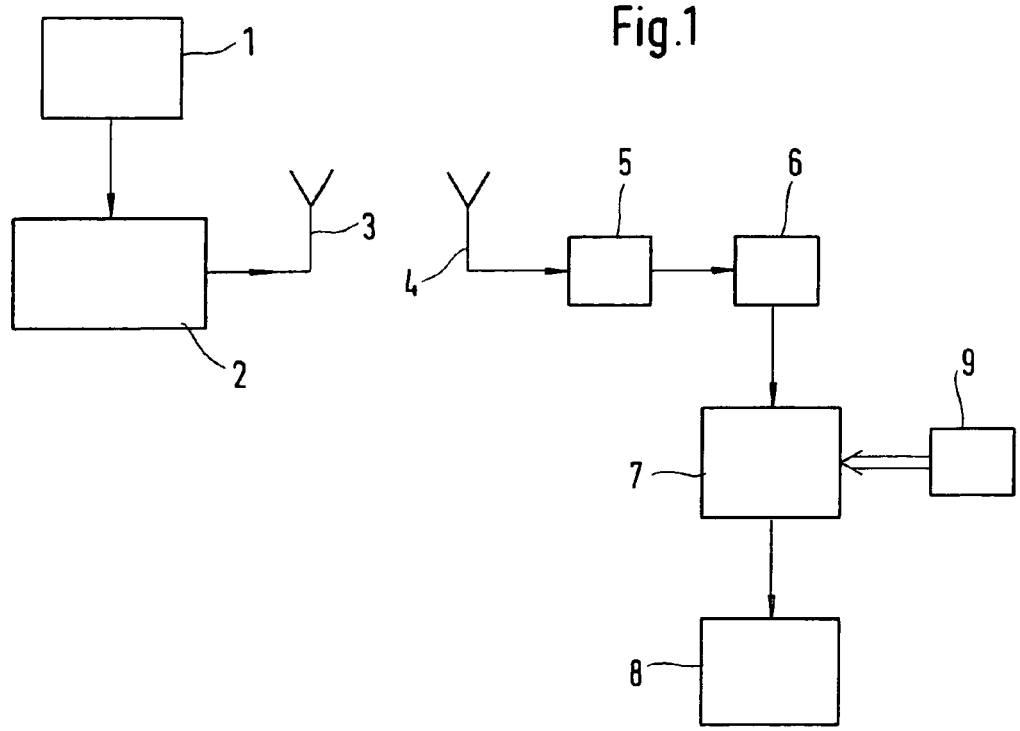
FIG. 1 shows a first block diagram of the child seat according to the present invention.

FIG. 1 shows a block diagram of the device of the present invention. In the child seat an energy store 1 is connected to a radio-identification chip 2. Via an output, radio-identification chip 2 is connected to an antenna 3. It is possible for all three components to be arranged on one element. They may also be separately accommodated in the fabrics of the child seat. In the seat of the vehicle, an antenna 1 is connected to a receiver module 5, which is connected to a control unit 6. Control unit 6 is connected to an airbag control unit 7 to which a sensory system 9 is connected as well. Airbag control device 7 is connected to restraining means 8.

Radio-identification chip 2 uses energy from energy storage 1 for its operation, which is a thermogenerator or a battery, and in this way continuously transmits identification signals via radio communication using antenna 3. Such an identifier is received by antenna 4 and transmitted to receiver module 5, which performs signal conditioning via amplification, mixing and filtering. Receiver module 5 then transmits the identifier as digital signal to the control unit or to processor 6, which compares the received identifier with stored identifiers so as to ascertain whether it is an identifier emitted by a child seat. If a child seat was detected, control unit 6 transmits a signal to airbag control device 7 that a child seat is located on the seat in question. In this case, airbag control unit 7 will not trigger the respective restraining means. Otherwise, in a trigger case that is detected by sensory system 9 such as acceleration sensors, airbag control unit 7 would trigger restraining means 8 also for the seat on which the child seat is located.

The radio signal emitted by antenna 3 has only a limited range, so that other receivers in the vehicle, in particular for the other seats, are unable to receive this radio signal. This may be achieved by using a very high transmitting frequency, for example, or a very low transmitting capacity. In particular the weak transmission output is advantageous since it places a low load on energy store 1 and is also non-critical with respect to electromagnetic compatibility. The acceptance of such a radio-identification chip will also increase if the environmental impact of the emitted radio signals, and especially the effect on a small child seated in the child seat, are negligible.

Figure 2:
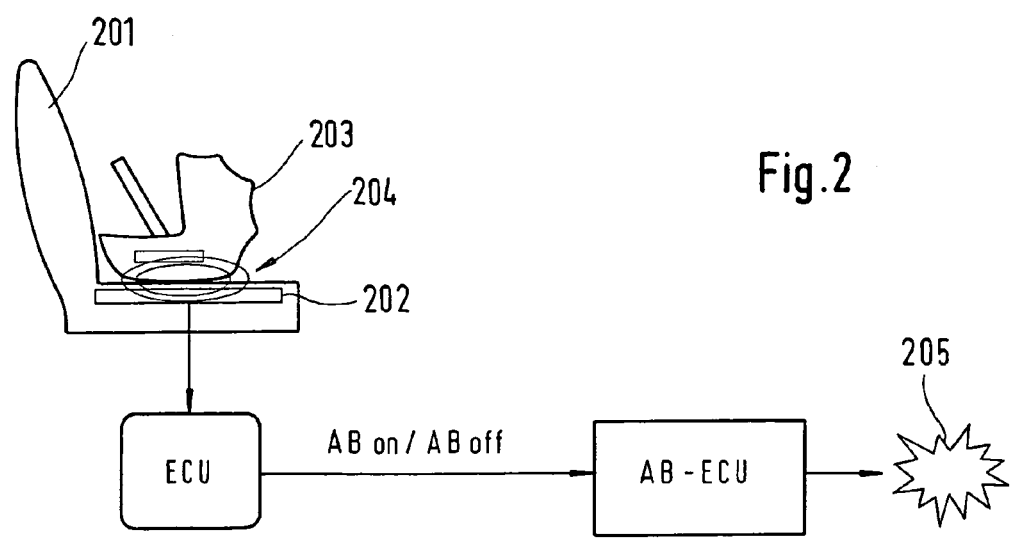
FIG. 2 shows a schematic representation of the device according to the present invention.

FIG. 2 shows a schematic representation of the device according to the present invention. A child seat 203 having the transmitter unit according to the present integrated into the fabric is arranged on a vehicle seat 201. Through contactless measurement 204 and with the aid of receiver 202, the vehicle seat detects the presence of a child seat on seat 201. This is recognized in the control unit ECU. The control unit ECU then transmits a corresponding signal to an airbag control unit AB-ECU checking whether the particular airbag is to be switched off or on. As a function thereof, airbag control unit AB-ECU then triggers restraining means 205.

Figure 3:
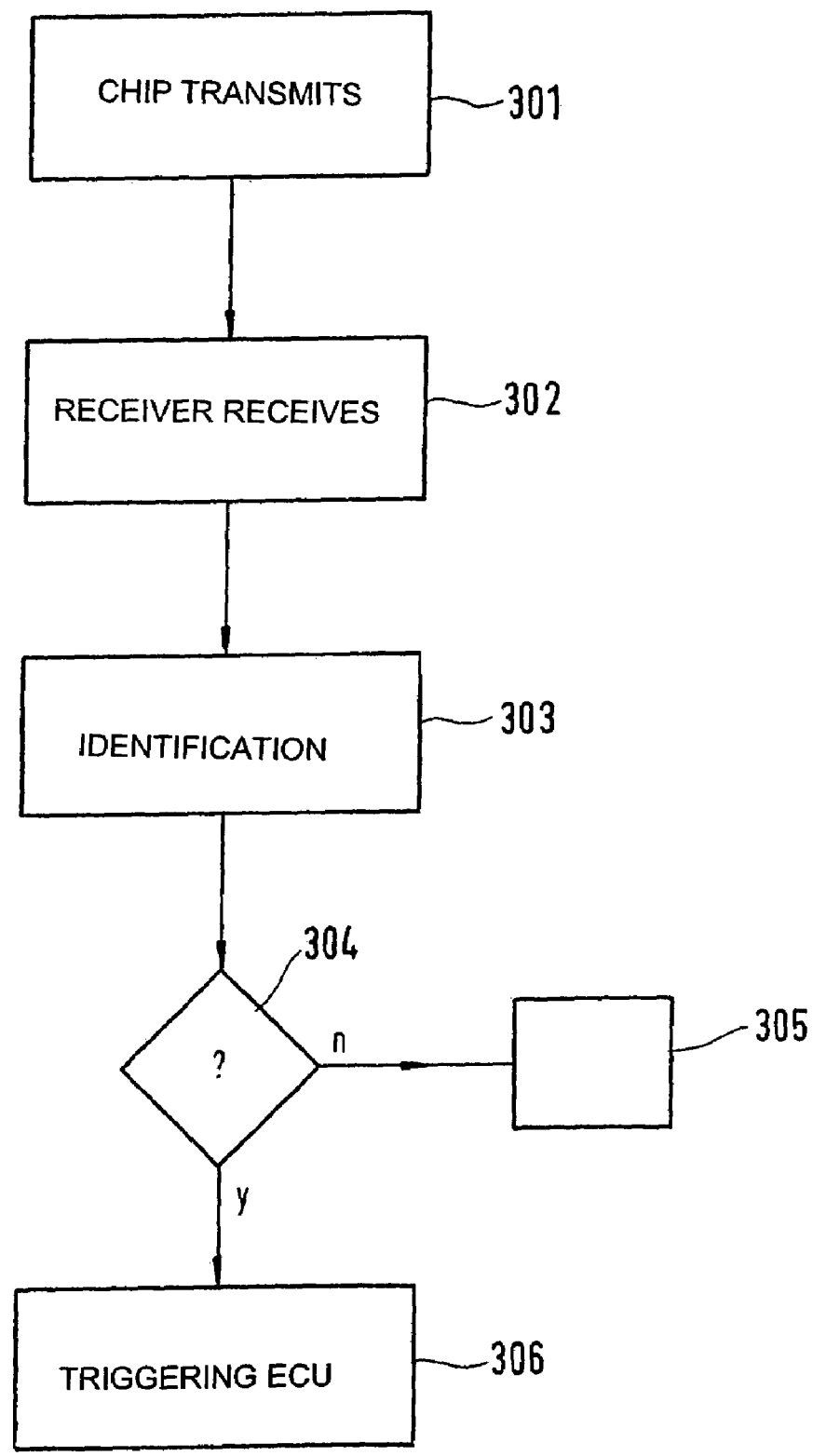
FIG. 3 shows a flow chart of the method for child-seat detection according to the present invention.

FIG. 3, in a flow chart, shows the sequence of the method for child-seat detection according to the present invention. In method step 301, radio-identification chip 2 transmits the identifier by means of a radio signal, with the aid of antenna 3. In method step 302, receiver 5, using antenna 4, receives this signal and transmits it to control unit 6. In method step 303, control unit 6 determines on the basis of the identifier whether a child seat is involved. If this is detected to be the case in method step 304, the airbag control unit will be triggered correspondingly in method step 306.

However, if it has been detected in method step 304 that no child seat is involved, the method is ended in method step 305.

Furthermore, this system offers the possibility of providing redundant information in addition to mass-determining sensors or pressure-foil sensors. The receive system on the vehicle side may just as well be integrated directly into the vehicle seat or into the seat back or the seat cover, in this way simplifying the mass production since the integration of foil-pressure sensors is very costly and may entail large tolerances during installation. An H-point increase is not given either since the characteristic of the fabric does not change. Another possible application is the integration of this electronics system in various seat pads. In the case of pressure foils, this results in blurring of the input signal. With appropriate identification it is possible to inform the control unit of this fact, and corresponding modifications may be made. This would prevent faulty classifications and possibly avoid de-energizing the airbag for persons as a result of faulty classifications.

The system according to the present invention preferably operates in the ISM frequency range or some other frequency range that is suitable for such short-range applications.

What is claimed is:

1. A child seat having radio-based identification, the child seat comprising:
    at least one radio-identification chip configured as a transmitter module and situated in the child seat, the at least one radio-identification chip having a specific identifier for transmission via a radio signal, wherein the at least one radio-identification chip is woven into fabrics used for the child seat; and a thermogenerator for supplying the at least one radio-identification chip with electrical energy.

2. A method for detecting a child seat, the method comprising: supplying by a theremogenerator an electrical energy to a radio-identification chip; and detecting the child seat with the aid of a radio signal produced by the radio-identification chip that is automatically transmitted from the child seat.

3. The method according to claim 2, wherein the radio signal is emitted on a permanent basis.

4. The method according to claim 2, wherein a seat-pressure profile is additionally utilized for child-seat detection.

5. The method according to claim 2, wherein an optical identification system is additionally utilized for child-seat detection.

* * * * *